April 21, 1970   HISATO WAKAMATSU ET AL   3,507,544
ANTI-SKID CONTROL APPARATUS FOR VEHICLES
Filed March 4, 1968

INVENTORS
HISATO WAKAMATSU
NORIYOSHI ANDO

BY Cushman, Darby & Cushman
ATTORNEYS

3,507,544
ANTI-SKID CONTROL APPARATUS
FOR VEHICLES

Hisato Wakamatsu and Noriyoshi Ando, Kariya-shi, Japan, assignors to Nippon Denso Company Limited, Kariya-shi, Japan, a corporation of Japan
Filed Mar. 4, 1968, Ser. No. 710,289
Claims priority, application Japan, Mar. 27, 1967, 42/19,451; May 18, 1967, 42/31,588
Int. Cl. B60t 8/08
U.S. Cl. 303—21                          2 Claims

ABSTRACT OF THE DISCLOSURE

An anti-skid control apparatus for vehicles, which enables a brake system to remove the brake force from the wheels of the vehicle when the angular deceleration of the wheels has reached a set value and, in addition, to perform such an anti-skid operation in which when the wheels have stopped rotating after the angular deceleration reached the set value, the brake force released state is maintained by the functioning of a timing circuit and when the wheels have started to rotate, the functioning of said timing circuit is stopped and the brake force is again applied to the wheels; and a safety device for said apparatus.

BACKGROUND OF THE INVENTION

Field of the invention

The present invention relates to an anti-skid control apparatus for vehicles, which enables a brake system to release the brake force from the wheels of the vehicle when the angular deceleration of the wheels has reached a set value and, in addition, to perform such an anti-skid operation in which when the wheels have stopped rotating after the angular deceleration reached the set value, the brake force released state is maintained by the functioning of a timing circuit and when the wheels have started to rotate, the functioning of said timing circuit is stopped and the brake force is again applied to the wheels; and a safety device for said apparatus.

DESCRIPTION OF THE PRIOR ART

The object of an anti-skid control apparatus for vehicles is after all to reduce the running speed of a vehicle without stopping the rotation of the wheels when a brake force is applied to the wheels of the vehicle. For this purpose, most of the conventional anti-skid control apparatus have been so designed as to detect by a flywheel mechanism the angular deceleration (m./s.$^2$) of the peripheral speed of the wheels, and to decrease the brake force being applied to the wheels in accordance with the detected value by power transmission means such as hydraulic pressure or electromagnetic force, thereby to avoid inoperativeness or an irregular gyrating movement of the vehicle body due to locking of the wheels caused by an excessively large brake force.

However, the conventional anti-skid control apparatus as described above have as drawback that, since the brake force is removed from the wheels only in the presence of a wheel angular deceleration signal, the scope of the braking condition is extremely limited and a satisfactory anti-skid operation cannot be equally obtained under the conditions wherein the coefficient of friction between the wheels and the surface of a road varies greatly, such as on the surface of a concrete paved road and the surface of a snowy frozen road.

The conventional anti-skid control apparatus for vehicles have also possessed as defect that a failure of even a single component part in the solenoid valve control relay circuit will result in an extremely serious accident such as a collision of vehicles.

SUMMARY OF THE INVENTION

In order to obviate the afore-mentioned drawbacks of the conventional apparatus, the present invention has for its object the provision of an anti-skid control apparatus for vehicles, in which means for detecting a wheel angular deceleration signal for releasing the brake force from the wheels when the angular deceleration of the wheels has reached a set value, is added with a timing circuit for maintaining the brake force released state of the wheels and a wheel rotation signal forming circuit adapted to produce an output signal in accordance with the rotation of the wheels, and a starting signal for said timing circuit is supplied by the wheel angular deceleration signal when the rotation of the wheels has been stopped by the wheel rotation signal forming circuit, whereas a resetting signal for said timing circuit is supplied by the wheel rotation signal forming circuit when the wheels have started to rotate again upon release of the brake force therefrom, whereby it is possible not only to obtain an anti-skid operation when the vehicle is running on the surface of such a road as a concrete paved road, which is relatively large in coefficient of friction, but also to prevent the vehicle from skidding with the wheels locked, without making the brake distance of the vehicle longer, by the functioning of the timing circuit, when the vehicle is running on the surface of such a road as a snowy frozen road, which is relatively small in coefficient of friction.

Another object of the present invention is to provide a safety device for an anti-skid control apparatus of the type described above, in which a group of power transistors consisting of a parallel circuit of at least two power transistors is connected to a relay winding in parallel relation thereto for conducting or interrupting a current through said relay winding in such a manner that it interrupts the current in the energized state and conducts the current in the deenergized state through said relay winding, and the collectors and the emitters of said group of power transistors are cut off by a charge discharged from a condenser which is connected between the bases and the emitters of said group of power transistors, whereby the possibility of erroneous operation of the apparatus due to breakage of the power transistors in said relay circuit is reduced drastically and hence the safety of the relay circuit is markedly enhanced.

DESCRIPTION OF THE PREFERRED EMBODIMENTS

First of all, a conventional anti-skid control apparatus will be described with reference to FIGS. 1 and 2.

Figure 1:
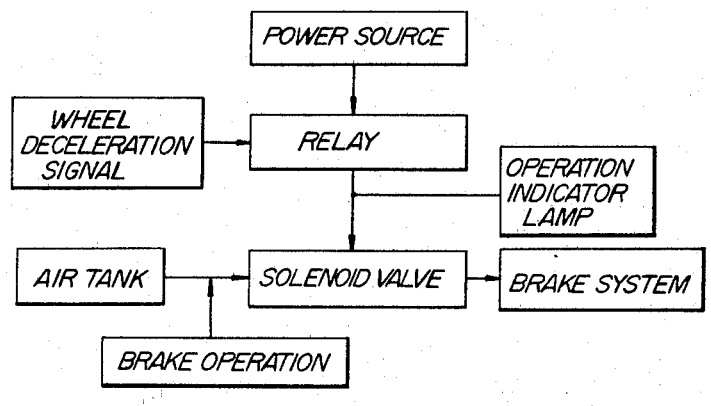
FIG. 1 is a flow diagram of a conventional anti-skid control apparatus for vehicles.
Figure 2:
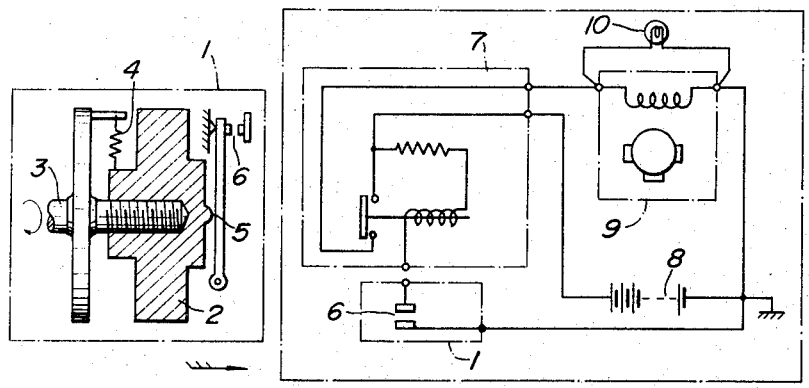
FIG. 2 is an electrical connection diagram of a conventional electromagnetic anti-skid control apparatus for vehicles.

In FIG. 1, there is shown a flow diagram of the conventional electromagnetic anti-skid control apparatus which is adapted for use with an air brake system and an air servo hydraulic brake system, while FIG. 2 shows the structure and the wiring diagram of a wheel drive shaft angular deceleration detector used in said apparatus. The angular deceleration detector, generally indicated by 1, operates as follows: namely, when an angular deceleration occurs in a rotary shaft 3, a rotational torque is created in a flywheel 2, so that said flywheel 2 makes a revolution relative to the rotary shaft 3 until it overcomes the bias of a spring 4 and consequently the mounting position of the flywheel 2 is changed. Since this revolution takes place along the screw threads, the flywheel 2 moves axially of the rotary shaft 3 in the direction of the arrow. Such movement of the flywheel 2 is amplified by a lever 5 and used for closing electrical contacts 6. When the contacts 6 are closed, a current from a power source 8 is conducted through a solenoid valve 9 by a relay 7. The solenoid valve 9 is a three-way valve which establishes communication between a brake chamber and an air tank through a brake valve in the deenergized state thereof, while it connects the brake chamber with an air discharge port in the energized stage thereof, by closing a passage leading to the air tank. In the braking operation, air in the air tank is introduced into the brake chamber through the solenoid valve, imposing a brake force on the wheels. When a predetermined angular deceleration has been obtained, the solenoid valve is energized, so that the air pressure in the brake chamber is reduced and accordingly the brake force is attenuated. Thus, the rotation of the wheel drive shaft is prevented from stopping. When, for instance, the angular deceleration signal detecting point is set so that a suitable brake force may be obtained on a concrete paved road surface which has a large coefficient of friction, it is inevitable, on the surface of a snowy frozen road having a small coefficient of friction, for the wheels to stop rotating in an extremely short period due to a delay in action of the air discharge system including the brake chamber, even though the brake force is once released from the wheels. With the conventional apparatus, when the angular deceleration of the wheels stops, the brake force is again imposed on the wheels despite of the fact that the wheels are not rotating, and therefore there is danger of the vehicle skidding with locked wheels. Of course, locking of the wheels can be avoided, even on the surface of a snowy frozen road, by setting the angular deceleration signal detecting point for an extremely small angular deceleration but, on the other hand, there will be the problem that the brake distance before the vehicle is brought to a halt becomes very long and such problem is particularly notable when the vehicle is running on the surface of the concrete paved road, losing the value of anti-skid operation.

Figure 3:
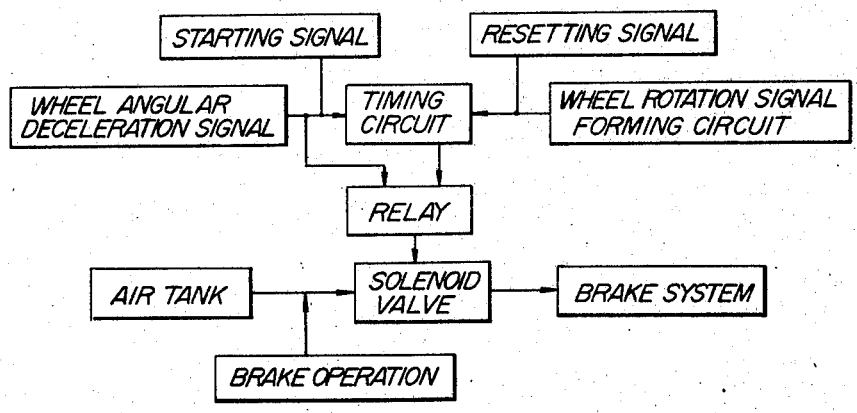
FIG. 3 is a flow diagram of the anti-skid control apparatus for vehicles according to the present invention.

Next, the structure of the anti-skid control apparatus according to the present invention will be briefly described with reference to FIG. 3. The apparatus is arranged to operate so that when the braking operation is put in effect, air in an air tank flows through a solenoid valve to actuate a brake system and a brake force is applied to the wheels. When the angular deceleration of the wheels has reached a set value by virtue of the brake force, an angular deceleration signal is produced to actuate a relay, so that the solenoid valve is energized and the brake force is released from the wheels. A timing circuit is provided which serves to maintain the brake force released state upon receipt of the angular deceleration signal when the rotation of the wheels has been stopped by the functioning of a wheel rotation signal forming circuit which is adapted to produce an output signal according to the rotation of the wheels. The timing circuit is reset by a signal from the wheel rotation signal forming circuit, which signal is produced when the wheels start to rotate again after they have once been stopped upon removal of the brake force.

Figure 4:
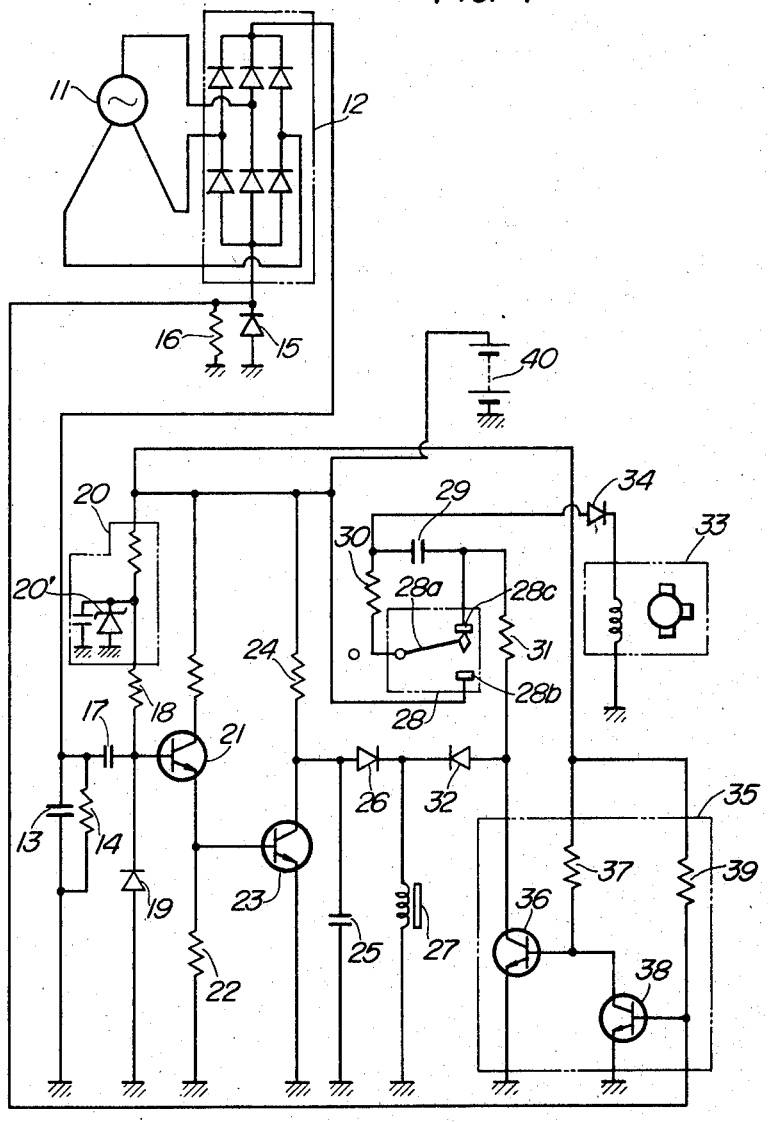
FIG. 4 is an electrical connection diagram of an embodiment of the anti-skid control apparatus according to this invention.

The anti-skid control apparatus of this invention will be described in further detail with reference to an embodiment thereof shown in FIG. 4. Referring to FIG. 4, reference numeral 11 designates a magneto-type three-phase A.C. generator and the input shaft thereof for rotating the magnet is rotated in accordance with the rotation of the wheels. The output of the three-phase A.C. generator 11 is converted into direct current voltage in proportion to the R.P.M. of the wheels by a three-phase full-wave rectifying circuit 12 and a smoothing circuit consisting of a condenser 13 and a resistor 14. A wheel rotation signal detecting element is composed of a diode 15 and a resistor 16, and is so arranged that a negative voltage is produced across the terminals of the diode 15 and the resistor 16 by the output of the three-phase A.C. generator 11 during rotation of the wheels. The desired amount of angular deceleration, for which the wheel angular deceleration signal is detected, is set by a condenser 17 and resistor 18 which compose a wheel angular deceleration signal detecting element. A diode 19 is provided to enable the condenser 17 to quickly discharge the charge stored therein when the angular deceleration of the wheels has reached a value above the set value. Reference numeral 20 represents a constant-voltage circuit comprising a constant-voltage diode 20'. A transistor 21 is provided to detect the angular deceleration of the wheels. When the vehicle is accelerated, a base current is supplied to the transistor 21 by the condenser 17 and the resistor 18, so that the collector and the emitter of said transistor are held in a conductive state. The collector and the emitter of the transistor 21 are also held in a conductive state during the running of the vehicle at a fixed speed by the base current supplied by the resistor 18, although no charging current flows through the condenser 17. Now, when the vehicle is decelerated, a voltage is impressed across the base and the emitter of the transistor 21 in an opposite direction due to the discharge of the charge stored in the condenser 17, so that the collector and the emitter of the transitsor 21 are cut off. A resistor 22 serves as a base resistor for a transistor 23. Reference numeral 24 designates a resistor which simultaneously serves as a circuit resistor through which a current is conducted through the solenoid 27 of the relay through the collector load of the transistor 23, the charging circuit resistor of a condenser 25 and a diode 26. The condenser 25 is provided to prevent the collector and the emitter of the transistor 23 from becoming conductive to immediately energize the solenoid 27 of the relay when the angular deceleration of the wheels exceeds the set value. The relay is actuated only after the vehicle has been decelerated continuously for a predetermined period of time and the terminal voltage of the condenser 25 has risen. Such a time delay is advantageous in preventing an erroneous operation of the apparatus due to travelling on a rough road or a play in the wheel driving system. Indicated generally by numeral 28 is the contact system of the relay which comprises a movable contact 28a and fixed contacts 28b and 28c. The movable contact 28a is normally held in contact with the fixed contact 28c. Reference numeral 29 designates a time setting condenser for the timing circuit, 30 and 31 designate resistors provided in a charging circuit for the condenser 29, and 32 designates a diode. The charging circuit for the condenser 29 is formed with the resistors 30 and 31, the diode 32 and the solenoid 27 when the movable contact 28a is brought into contact with the fixed contact 28b by the attractive force of the solenoid 27. The resistor 30 also acts to enable the condenser 29 to quickly discharge the charge stored therein. A solenoid valve 33 is energized through a diode 34 when the movable contact 28a is brought into contact with the fixed contact 28b by the attractive force of the solenoid 27 of the relay. Reference numeral 35 designates a wheel rotation signal forming circuit, 36 designates a transistor, 37 designates a resistor, 38 designates a transistor and 39 designates a resistor. When the wheels are rotating, a negative voltage produced across the terminals of the diode 15 and the resistor 16, is impressed on the base electrode of the transistor 38, and the collector and the emitter of the transistor 38 are cut off. Reference numeral 40 designates a power source.

The apparatus of the present invention constructed as described above will operate in the following manner: when the vehicle is running at a fixed speed, the output of the three-phase A.C. generator 11 is subjected to full-wave rectification and smoothing and a direct current voltage in proportion to the running speed of the vehicle is impressed across the terminals of the condenser 13, with no fluctuation with respect to time. Therefore, the discharge and charging currents of the condenser 17 are held in equilibrium state, with no current flowing through said condenser. On the other hand, the transistor 21 is supplied with a base current by the resistor 18, so that the collector and the emitter of said transistor are held in a conductive state. As a result, a voltage is developed across the terminals of the resistor 22, and the collector and the emitter of the transistor 23 are rendered conductive. The terminal of the resistor 24 opposite to the power source is grounded. Therefore, the solenoid 27 of the relay is not energized and accordingly the relay is held inoperative. When the running speed of the vehicle is reduced by a brake force applied to the wheels by the braking operation, the direct current voltage across the terminals of the condenser 13 drops with the lapse of time. The condenser 17 begins to discharge the charge stored therein and the potential of the base electrode of the transistor 21 becomes negative with respect to the ground. In this case, whether the potential of the base electrode of the transistor 21 becomes negative or not is determined by the amount of the current flowing through the resistor 18. In other words, the amount of variation in angular deceleration to generate a wheel angular deceleration signal can be set by the resistor 18 and the capacity of the condenser 17. When the potential of the base electrode of the transistor 21 has become negative in the manner described, the collector and the emitter of said transistor are cut off and similarly the collector and the emitter of the transistor 23 are cut off. Upon deenergization of the transistor 23, the current flowing through the resistor 24 charges the condenser 25 and thereby the voltage across the terminals of the condenser 25 rises progressively. Consequently, the voltage is impressed on the solenoid 27 through the diode 26. When the voltage has reached a predetermined value, the solenoid 27 performs relaying action, attracting the movable contact 28a of the relay contact system 28 to bring it into contact with the fixed contact 28b, whereby the solenoid valve 33 is energized and the brake force is released from the wheels. Consequently, the rotation of the wheels increases again by virtue of the friction with the road surface and the direct current impressed across the terminals of the condenser 13 rises accordingly, charging the condenser 17. As a result, the collectors and the emitters of the respective transistors 21 and 23 become conductive and the current flowing through the solenoid 27 of the relay is interrupted, so that the movable contact 28a of the relay contact system returns to its original position, interrupting the current flowing through the solenoid valve 33. Therefore, a brake force is applied again to the wheels, decelerating the vehicle. Thereafter, the operation described above is repeated until the vehicle is finally brought to a halt. However, the operation described above is effective when the vehicle is running on the surface of a road such as a concrete paved road which has a large coefficient of friction with the wheels, and if the brake force is applied to the wheels in the same manner as above described when the vehicle is running on the surface of such a road as a snowy frozen road which has a small coefficient of friction with the wheels, the time interval in which the wheel angular deceleration signal is produced will be very short and the wheels will become locked immediately. However, as the wheels are locked, the negative voltage developed across the terminals of the diode 15 and the resistor 16 becomes zero, energizing the transistor 38 in the wheel rotation signal forming circuit 35. Therefore, the collector and the emitter of the transistor 36 are cut off and the charging current for the condenser 29 entirely flows through the solenoid 27 of the relay. For this reason, the attractive force of the solenoid 27 of the relay remains in effect for a while even after the collectors and the emitters of the respective transistors 21 and 23 are rendered conductive due to the disappearance of the wheel angular deceleration signal. Thus, the current is continuously conducted through the solenoid valve 33 despite of the fact that the collectors and the emitters of the transistors 21 and 23 are in a conductive state, and thereby the wheels are kept free from the brake force. As the air pressure in the brake system has been reduced and the brake force to the wheels has been attenuated sufficiently, the wheels are driven by the road surface and rotated again. The three-phase A.C. generator 11 starts to generate a current and a negative voltage is impressed on the base of the transistor 38 in the wheel rotation signal forming circuit 35 by the diode 15 and the condenser 16, so that the collector and the emitter of said transistor are cut off. Consequently, the collector and the emitter of the transistor 36 become conductive and the current charging the condenser 29 in the timing circuit and the current flowing through the solenoid valve 33 are interrupted. A brake force is applied to the wheels again and thereafter, the above-described operation is repeated until the vehicle is finally brought to a halt.

Hereinafter, the inventive apparatus will be further illustrated with reference to an experimental example.

The apparatus of the present invention was installed on an automotive vehicle of 11 tons in weight, with the wheel drive shaft angular deceleration for the generation of a wheel angular deceleration signal set at 15 m./s.² based on wheel peripheral deceleration, the time delay of the wheel angular deceleration signal at 0.1 second, the timing of the timing circuit at 1.2 seconds and the detecting point of the output of the wheel rotation signal forming circuit at 3 km./h. based on the running speed of the vehicle. A satisfactory anti-skid operation was obtained under the surface conditions of the road ranging from a dry surface of concrete paved road (0.7 in coefficient of friction) to a snowy frozen road surface (0.12 in coefficient of friction), upon quick application of a brake force.

No malfunction of the apparatus was observed during the normal running of the automotive vehicle under the conditions set forth above.

According to the present invention in which as described above, the means for detecting a wheel angular deceleration signal for releasing the brake force from the wheels when the angular deceleration of the wheels has reached a set value, is added with the timing circuit for maintaining the brake force released state and the wheel rotation signal forming circuit which generates an output signal in accordance with the rotation of the wheels, said timing circuit being placed in operation by the wheel angular deceleration signal when the rotation of the wheels has been stopped by the functioning of the wheel rotation signal forming circuit and reset by a signal from the wheel rotation signal forming circuit when the wheels have started rotating upon releasing the brake force therefrom, there are brought about such advantages that a satisfactory anti-skid operation can be obtained on the surface of such a road as a concrete paved road which has a relatively large coefficient of friction, by the action of the wheel angular deceleration signal; that skidding of a vehicle with locked wheels can be prevented positively even on the surface of such a road as a snowy frozen road which has a relatively small coefficient of friction by the functioning of the timing circuit which maintains the brake force removed state from the time when the wheels have stopped rotating to the time when the wheels begin to rotate again; and further that the brake distance of the vehicle on the surface of such a road as a snowy frozen road can be shortened further because, since the timing circuit is reset by a signal from the wheel rotation signal forming circuit, a brake force is applied to the wheels immediately when the wheels begin to rotate again after they have once been stopped upon removal of the brake force.

Figure 6:
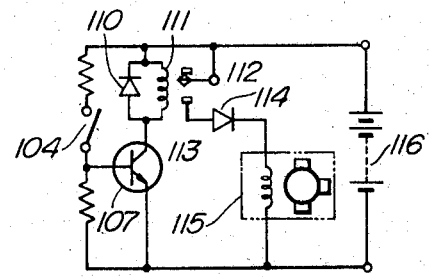
FIG. 6 is an electrical connection diagram of the solenoid valve control relay circuit of the conventional anti-skid control apparatus.

A description will now be given of a safety device for the solenoid valve control relay circuit in the anti-skid control apparatus according to the present invention. First of all, the solenoid valve control relay circuit in a conventional anti-skid control apparatus will be explained with reference to FIG. 6. The relay circuit, as shown, comprises a relay winding 111 and a power transistor 107 connected in series thereto. The base circuit of the power transistor 107 is connected in series to a power source 116. Therefore, when shorting occurs due to failure of a switch 104 or the power transistor 107, a movable contact 112 is undesirably held in an attracted position by the relay winding 111, permitting a current to continuously flow through a solenoid valve 115, so that no brake force is applied to the wheels even when the main brake system of the vehicle is put in operation. The conventional circuit of such a structure, therefore, had as the problem that a failure of even one component part in the circuit resulted in a serious accident such as a collision of vehicles.

Figure 5:
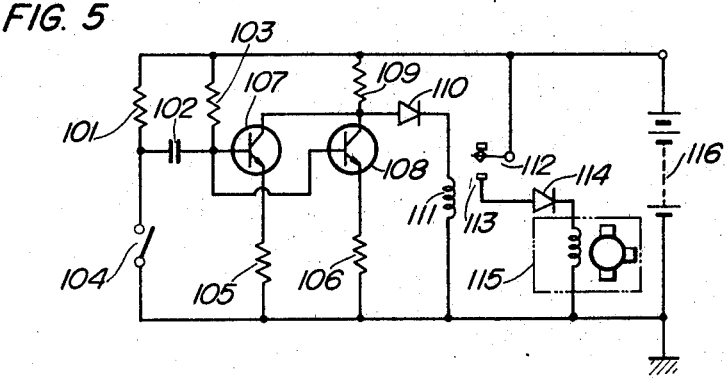
FIG. 5 is an electrical connection diagram of an embodiment of the solenoid valve control relay circuit of the inventive anti-skid control apparatus.

The safety device for the solenoid valve control relay circuit in the anti-skid control apparatus of this invention will be described with reference to FIG. 5 by way of example. In FIG. 5, reference numeral 101 designates a resistor for charging a condenser 102, 103 designates a resistor for supplying a current to the bases of transistors 107 and 108, and 104 designates a switch which is operated by a wheel angular speed detecting circuit not shown. The condenser 102 discharges the charge stored therein upon closure of the switch 104. The emitters of the power transistors 107 and 108 are respectively connected to resistors 105 and 106, while the collectors thereof are respectively connected to a resistor 109. A diode 110 is provided to protect the power transistors 107 and 108 by interrupting a back electromotive force developed in the relay winding 111. A movable contact 112 is brought into contact with a fixed contact 113 in the energized state of the relay winding 111. A diode 114 is provided to protect the movable contact 112 and the fixed contact 113 of the relay by interrupting a back electromotive force developed in a solenoid valve 115. The solenoid valve 115 is so constructed that it will release the brake force from the wheels when energized. Reference numeral 116 designates a power source.

When the switch 104 is in an open position as shown in FIG. 5, a current is supplied to the bases of the power transistors 107 and 108 through the resistor 103, energizing said power transistors, and no current is conducted through the relay winding 111. Therefore, the solenoid valve 115 is held in a deenergized state. If, in operation, shorting occurs due to failure of the switch 104, the charge stored in the condenser 102 is discharged through the switch 104, and no current is supplied to the bases of the power transistors 107 and 108, whereby said power transistors are maintained in a deenergized state, and the current flows through the relay winding 111 to energize the solenoid valve 115. However, since the condenser 102 stops discharging in a certain period of time which is determined by the capacity of said condenser and the resistance value of the resistor 103, the current is again supplied to the bases of the power transistors 107 and 108 through the resistor 103 and thus the solenoid valve 115 is deenergized. Now, if shorting occurs due to a failure of one or both of the power transistors 107 and 108 in the open state of the switch 104, no current is conducted through the relay winding 111 and accordingly the solenoid valve 115 is held in a deenergized state. Next, if either one of the power transistors 107 and 108 is rendered non-conductive condition due to a failure, with the switch 104 open, another one of said power transistors which did not fail, is held in an energized state by a current supplied to the base thereof through the resistor 103. Thus, no current flows through the relay winding 111 and the solenoid valve 115 is maintained in the deenergized state. A failure of the power transistors 107 and 108 results more frequently in shorting of said transistors than in cut-off thereof. By connecting the two power transistors 107 and 108 in parallel, the possibility of both of the power transistors being cut-off simultaneously due to failure, can be made extremely small. It will be obvious that the posibility of the solenoid valve 115 being undesirably kept in the energized state due to the cut-off of the power transistors caused by a failure of said power transistors, can be further reduced by connecting a large number of such power transistors in parallel relation to provide for interruption of the current flowing through the relay winding 111.

As will be understood from the foregoing description, the relay circuit according to the present invention can be used not only in the anti-skid apparatus for vehicles but also in numerous other electric equipment where such a circuit, i.e. one in which the current flowing through a relay winding is to be interrupted by a power transistor, is required.

According to the relay circuit of this invention, in which as described above, a group of power transistors consisting of a parallel circuit of at least two power transistors is connected in parallel to a relay winding for conducting or interrupting the current through said relay winding in such a manner that it interrupts the current in the energized state and conducts the current in the deenergized state, and further the collectors and emitters of said power transistors are cut-off by the charge discharged from a condenser which is connected across the bases and the emitters of said power transistors, it is possible to substantially eliminate the possibility of erroneous operation caused by a failure of the power transistors and hence the safety of the relay circuit can be greatly enhanced. The relay circuit of the present invention is particularly advantageously used in an anti-skid apparatus for vehicles, in which an erroneous operation of the relay circuit will cause continuous energization of a solenoid valve for removing the brake force from the wheels, with a consequent loss of braking ability. The use of the relay circuit according to the present invention in the anti-skid apparatus brings about remarkable advantages in preventing the loss of braking ability of the vehicle and therefore in preventing a serious accident such as a collision of vehicles which endangers human life.

What is claimed is:

1. An anti-skid control apparatus for vehicles, which comprises means for producing a wheel angular deceleration signal for releasing the brake force from the wheels when the angular deceleration of the wheels has reached a set value, means for detecting said wheel angular deceleration signal, a timing circuit for maintaining the brake force released state of the wheels, and a wheel rotation signal forming circuit for producing an output signal in accordance with rotation of the wheels, said timing circuit and said wheel rotation signal forming circuit being electrically connected to said second means, and said timing circuit being placed in operation by the wheel angular deceleration signal when the rotation of the wheels has been stopped by said wheel rotation signal forming circuit and being reset by a signal from said wheel rotation signal forming circuit when the wheels begin to rotate again upon removal of the brake force therefrom.

2. An anti-skid control apparatus for vehicles according to claim 1 having a solenoid valve and a safety relay circuit controlling energization and de-energization of the solenoid valve for applying and releasing the brake force, which relay circuit comprises a group of power transistors consisting of a parallel circuit of at least two power transistors and connected in parallel to a relay winding for conducting or interrupting a current through said relay winding in such a manner that it interrupts the current in the energized state and conducts the current in the deenergized state, and a condenser connected between the bases and the emitters of said power transistors so that the collectors and the emitters of said power transistors may be cut-off by a charge discharged from said condenser.

References Cited

UNITED STATES PATENTS

| | | | |
|---|---|---|---|
| 3,034,836 | 5/1962 | Ruof | 303—21 |
| 3,398,995 | 8/1968 | Martin | 303—21 |
| 3,441,320 | 4/1969 | Flory | 303—21 |

DUANE A. REGER, Primary Examiner

U.S. Cl. X.R.

317—148.5